United States Patent [19]

Morita

[11] Patent Number: 4,819,171

[45] Date of Patent: Apr. 4, 1989

[54] ENGINE SPARK TIMING CONTROL SYSTEM

[75] Inventor: Tatsuo Morita, Yokosuka, Japan

[73] Assignee: Nissan Motor Co., Limited, Kanagawa, Japan

[21] Appl. No.: 891,926

[22] Filed: Jul. 31, 1986

[30] Foreign Application Priority Data

Aug. 5, 1985 [JP] Japan .................. 60-172933
Aug. 6, 1985 [JP] Japan .................. 60-173770

[51] Int. Cl.$^4$ ............................. F02P 5/14
[52] U.S. Cl. .................. 364/431.08; 123/419; 123/425; 73/35
[58] Field of Search ........... 364/431.03, 431.07, 364/431.08; 123/418, 419, 422, 423, 425; 73/35

[56] References Cited

U.S. PATENT DOCUMENTS

| | | | |
|---|---|---|---|
| 4,002,155 | 1/1977 | Harned et al. | 123/425 |
| 4,289,102 | 9/1981 | Katsumata et al. | 123/425 |
| 4,420,967 | 12/1983 | Enoshima et al. | 73/35 |
| 4,517,945 | 5/1985 | Ishigami et al. | 123/425 |
| 4,517,952 | 5/1985 | Hosoya | 123/638 |
| 4,582,032 | 4/1986 | Hara et al. | 123/339 |
| 4,590,565 | 5/1986 | Takasu et al. | 364/431.08 |
| 4,630,583 | 12/1986 | Suzuki et al. | 123/425 |
| 4,640,249 | 2/1987 | Kawamura et al. | 123/425 |
| 4,658,789 | 4/1987 | Morita | 123/422 |
| 4,660,535 | 4/1987 | Asano | 123/425 |

FOREIGN PATENT DOCUMENTS

59-138773  8/1984  Japan .

Primary Examiner—Parshotam S. Lall
Assistant Examiner—V. N. Trans
Attorney, Agent, or Firm—Foley & Lardner, Schwartz, Jeffery, Schwaab, Mack, Blumenthal & Evans

[57] ABSTRACT

A basic target spark timing is determined in accordance with an operating condition of an engine. A spark timing knock corrective value is determined in accordance with the presence or absence of a knock in the engine. A spark timing learning corrective value is determined in accordance with the spark timing knock corrective value and with the engine operating condition. When a transitional condition of the engine is detected, the spark timing knock corrective value is fixed to a preset value independent of the presence or absence of the knock and also independent of the engine operating condition. A final target spark timing is determined in accordance with the basic target spark timing, the spark timing knock corrective value, and the spark timing learning corrective value. A spark is generated in the engine at a timing in agreement with the final target spark timing.

8 Claims, 6 Drawing Sheets

ENGINE SPARK TIMING CONTROL SYSTEM

BACKGROUND OF THE INVENTION

1. Field of the Invention

This invention relates to a spark timing control system for an engine, such as an automotive internal combustion engine.

2. Description of the Prior Art

Japanese patent publication 59-138773 discloses a spark timing control system for an internal combustion engine. In this system, a spark is generated at a moment concurrent with a target spark timing. The target spark timing is calculated from a basic spark timing, and first and second corrective values. The basic spark timing is generally derived from the engine speed and the engine load. The first corrective value, called a knock corrective value, directly depends on whether or not a knock currently occurs in the engine. The second corrective value, called a learning corrective value, consists of a learning control factor which depends on the engine speed and the engine load, and also on a previous first corrective value.

The system in the above-mentioned Japanese document tends to control the spark timing unacceptably during or immediately after abruptly transitional engine operating conditions. This unacceptable control of the spark timing generally results for the following reason. The control of the spark timing in accordance with the knock corrective value has a response speed lower than the speeds of these abrupt transitions between engine operating conditions. This control is maintained during these transitional engine operating conditions.

SUMMARY OF THE INVENTION

It is an object of this invention to provide an engine spark timing control system which operates acceptably during and immediately after transitional engine operating conditions.

In a spark timing control system of this invention, a basic target spark timing is determined in accordance with an operating condition of an engine. A spark timing knock corrective value is determined in accordance with presence or absence of a knock in the engine. A spark timing learning corrective value is determined in accordance with the spark timing knock corrective value and with the engine operating condition. When a transitional condition of the engine is detected, the spark timing knock corrective value is fixed to a preset value independent of the presence or absence of the knock and also independent of the engine operating condition. A final target spark timing is determined in accordance with the basic target spark timing, the spark timing knock corrective value, and the spark timing learning corrective value. A spark is generated in the engine at a timing in agreement with the final target spark timing.

DESCRIPTION OF THE FIRST PREFERRED EMBODIMENT

Figure 1:
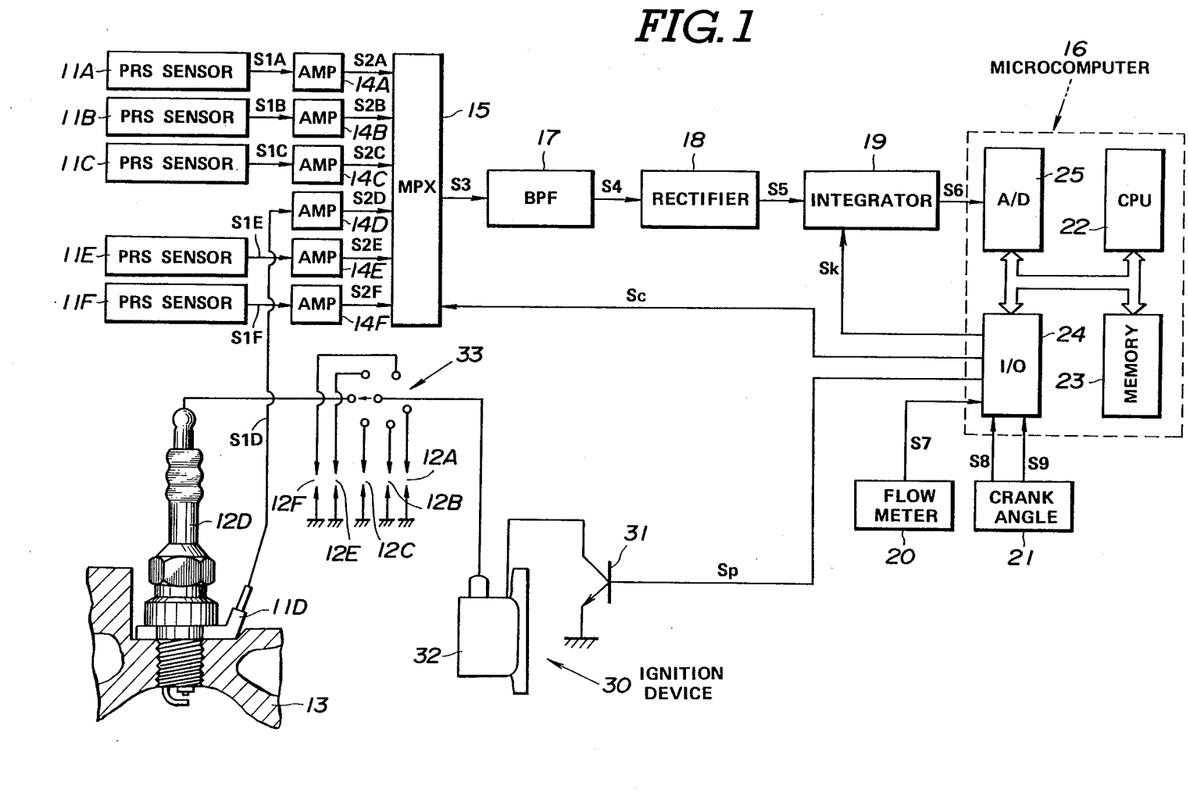
FIG. 1 is a diagram of an engine spark timing control system according to a first embodiment of this invention.

With reference to FIG. 1, a spark timing control system for a six-cylinder engine includes pressure sensors 11A, 11B, 11C, 11D, 11E, and 11F associated with six engine cylinders respectively. These sensors 11A–11F detect pressures within the associate engine cylinders respectively. The pressure sensor 11D is shown in a sectional view. The other pressure sensors 11A–11C, and 11E–11F are shown by blocks.

The pressure sensor 11D is in the form of a washer, fixedly sandwiched between the shoulder section of a spark plug 12D and the section of a cylinder head 13 directly above the associate engine cylinder. The pressure sensor 11D includes a piezoelectric element. The piezoelectric element is exposed to a force resulting from the pressure within the associate engine cylinder, so that it is electrically polarized in accordance with the pressure within the associate engine cylinder. The pressure sensor 11D generates an electric charge signal S1D which varies as a function of the pressure within the associate engine cylinder.

The other pressure sensors 11A–11C, and 11E–11F are similar to the pressure sensor 11D except for locations. The pressure sensors 11A–11C, and 11E–11F are placed directly above the associate engine cylinders respectively. Accordingly, the pressure sensors 11A–11C, and 11E–11F generate electric charge signals S1A–S1C, and S1E–S1F which depend on the pressures within the associate engine cylinders respectively.

Figure 2:
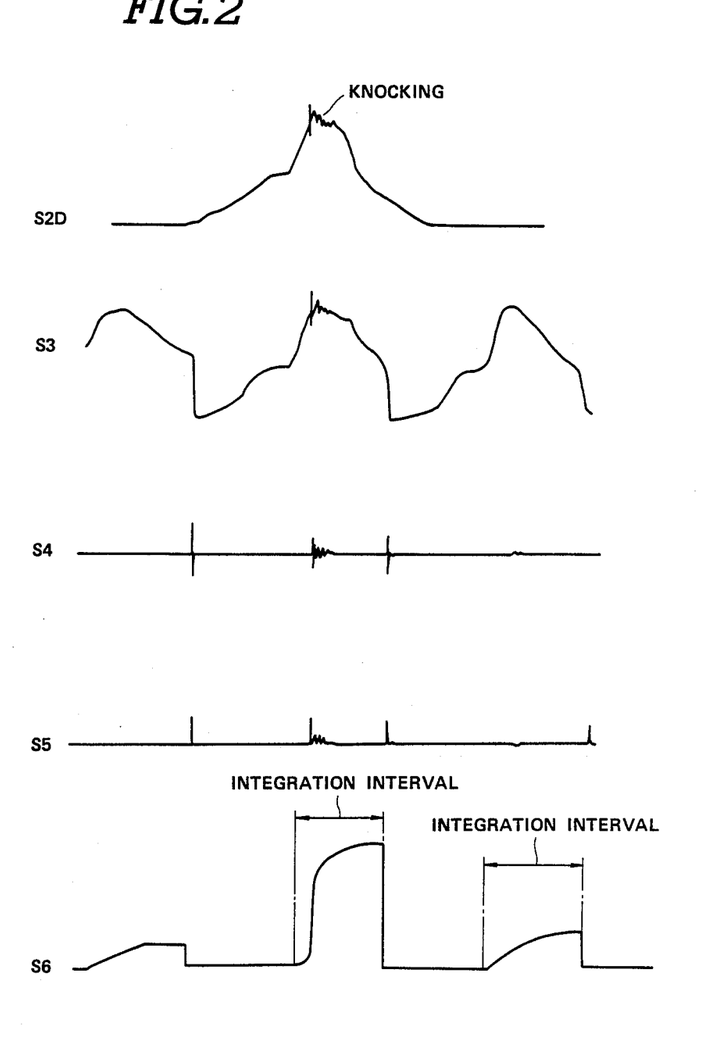
FIG. 2 is a timing diagram or waveforms of signals generated in the control system of FIG. 1.

Amplifiers 14A, 14B, 14C, 14D, 14E, and 14F derive voltage signals S2A, S2B, S2C, S2D, S2E, and S2F from the electric charge signals S1A, S1B, S1C, S1D, S1E, and S1F respectively. The voltages of the signals S2A–S2F increase with the pressures within the engine cylinders respectively. The waveform of the pressure signal S2D is shown in FIG. 2. When a knock occurs in an engine cylinder, the related pressure signal is vibrated at particular frequencies as shown in FIG. 2.

A multiplexer 15 (MPX) selects one of the pressure signals S2A–S2F sequentially in accordance with a channel selection signal Sc issued from a microcomputer unit 16. The sequence of selection of the pressure signals corresponds to the spark order for the engine cylinders. The selected signal is transmitted to a band-pass filter (BPF) 17. In this way, the output signal S3 from the multiplexer 15 to the band-pass filter 17 consists of the selected signals. The waveform of the multiplex signal S3 is shown in FIG. 2.

The band-pass filter 17 abstracts knock-related components from the multiplex signal S3. Specifically, the components of the multiplex signal S3 having frequencies in the range of approximately 5–20 KHz are allowed to pass through the filter 17. The components of the multiplex signal S3 having other frequencies are cut off by the filter 17. The band-pass filter 17 outputs a signal S4. The waveform of the signal S4 is shown in FIG. 2.

The output signal S4 from the band-pass filter 17 is processed by a full-wave rectifier 18. This element 18 outputs a rectified signal S5. The waveform of the rectified signal S5 is shown in FIG. 2. It should be noted that a half-wave rectifier may be used in place of the full-wave rectifier.

The output signal S5 from the rectifier 18 is integrated by an integrator 19. The integrator 19 outputs a signal S6 to the microcomputer unit 16. The integrator 19 is set and reset by a control signal Sk issued from the microcomputer unit 16. Specifically, the control signal Sk enables the integrator 19 to start integrating the signal S5 at a crank angle 10° after the top dead center (10° ATDC) on the compression stroke of each engine cylinder. The integrator 19 continues the integration until a crank angle 45° after the top dead center (45° ATDC) on the compression stroke of the engine cylinder. At the crank angle equal to 45° ATDC, the control signal Sk forces the integrator 19 to interrupt the integration and resets the signal S6. During other crank angle intervals, the integration by the integrator 19 remains suspended.

The crank angle interval during which the rectified signal S5 is integrated is chosen so as to cover a period in which general engine knocks occur. Accordingly, the signal S6 represents the level or intensity of engine knock. The waveform of the knock-related signal S6 is shown in FIG. 2. The microcomputer unit 16 samples the knock-related signal S6 at the end of the integration interval. The interation interval is preferably chosen so that the knock-related signal S6 will essentially be free from or independent of knock-unrelated noises, such as ignition noises, noises caused by seating of cylinder inlet and outlet valves, and noises caused by selecting operation of the multiplexer 15.

An air flow meter 20 generates a signal S7 representing the rate of intake air flow into the engine. The air flow rate signal S7 is applied to the microcomputer unit 16.

A crank angle sensor 21 generates a reference pulse S8 at a crank angle 70° before the top dead center (70° BTDC) on the compression stroke of each engine cylinder. In general, the crank angle duration of the reference pulse S8 for particular one of the engine cylinders is longer than the crank angle duration of the reference pluses S8 for the other engine cylinders. The reference signal S8 is applied to the microcomputer unit 16. The crank angle sensor 21 also generates a position pulse S9 each time the engine crankshaft rotates through 1° or 2°. The position signal S9 is applied to the microcomputer unit 16.

The microcomputer unit 16 discriminates the engine cylinder which is currently exposed to the combustion of an air-fuel mixture in accordance with the reference pulses S8 and the position pulses S9. Specifically, the crank angle duration of the reference pulse S8 is detected by counting the position pulses S9 during an interval between the leading and trailing edges of the reference pulse S8. The microcomputer unit 16 determines whether the reference pulse S8 is longer or shorter in accordance with the detection of its duration. The particular engine cylinder is discriminated when the longer reference pulse S8 occurs. The other engine cylinders are discriminated by counting the reference pulses S8 after the receipt of the longer reference pulse S8. The channel selection signal Sc is adjusted in accordance with this cylinder discrimination.

The microcomputer unit 16 detects the current crank angle by counting the position pulses S9 after the receipt of the reference pulse S8. The integration control signal Sk is adjusted in accordance with this detected crank angle.

The microcomputer unit 16 detects the current engine speed by counting the position pulses S9 during a fixed time interval. It should be noted that an engine speed sensor separate from the crank angle sensor 21 may be used to detect the engine speed.

The microcomputer unit 16 includes the combination of a central processing unit (CPU) 22, a memory section 23, an input/output (I/O) circuit 24, and an analog-to-digital (A/D) converter 25. The memory section 23 has a read-only memory (ROM) and a random-access memory (RAM).

The A/D converter 25 samples the signal S6 at the end of the period of integration of the signal S5 and converts it into a corresponding digital signal. The I/O circuit 24 receives the air flow rate signal S7, and the crank angle signals S8 and S9. The I/O circuit 24 outputs the channel selection signal Sc and the integration control signal Sk. In addition, the I/O circuit 24 outputs a spark control signal Sp in the form of a pulse train.

An ignition device 30 receiving the spark control signal Sp generates sparks within the engine cylinders sequentially. As will be made clear hereinafter, the timing of spark is adjusted in accordance with the spark control signal Sp.

The ignition device 30 includes a power transistor 31. The collector-emitter path of the power transistor 31 is connected in series with a battery (not shown) and the primary winding of an ignition coil 32. The base of the power transistor 31 receives the spark control signal Sp. The power transistor 31 switches in accordance with the spark control signal Sp, interrupting and allowing the flow of an electrical current through the primary winding of the ignition coil 32. The secondary winding of the ignition coil 32 is connected to a rotatable contact of a distributor 33, which moves into and out of contact with fixed contacts of the distributor 33 in accordance with rotation of a camshaft of the engine. Spark plugs 12A, 12B, 12C, 12D, 12E, and 12F for the engine cylinders are connected to the fixed contacts of the distributor 33 respectively. The spark plug 12D is shown in a side view. The other spark plugs 12A-12C, and 12E-12F are shown in schematic diagrams.

High potentials are induced across the secondary winding of the ignition coil 32 in accordance with the switching operation of the power transistor 31 which is controlled by the spark control signal Sp These high potentials are distributed via the element 33 to the spark plugs 12A-12F sequentially, generating sparks across the spark plugs and thereby igniting an air-fuel mixture within the engine cylinders. In this way, the spark timing is determined by the spark control signal Sp.

As described previously, the microcomputer unit 16 detects the current crank angle in accordance with the crank angle signals S8 and S9. This detection of the current crank angle is used in timing control of the spark signal Sp.

The microcomputer unit 16 generates fuel injection pulses driving a fuel injection valve or valves (not shown). The fuel injection pulses are outputted in sychronism with engine crankshaft revolution, so that the frequency of the fuel injection pulses is proportional to the engine speed. The duration or width of the fuel injection pulses determines the time interval during which the fuel injection valve or valves are open. Accordingly, the rate of fuel injection depends on the duration of the fuel injection pulses. The microcomputer unit 16 controls the fuel injection rate by adjusting the duration of the fuel injection pulses. The fuel injection rate is controlled in accordance with an engine operating condition or conditions. To this end, the duration of the fuel injection pulses is basically adjusted in accordance with the engine speed and the intake air flow rate by referring to the following equation:

$$Tp = kQ/N$$

where Tp, k, Q, and N represent the duration of the fuel injection pulses, a constant, the intake air flow rate, and the engine speed, respectively.

Figure 3:
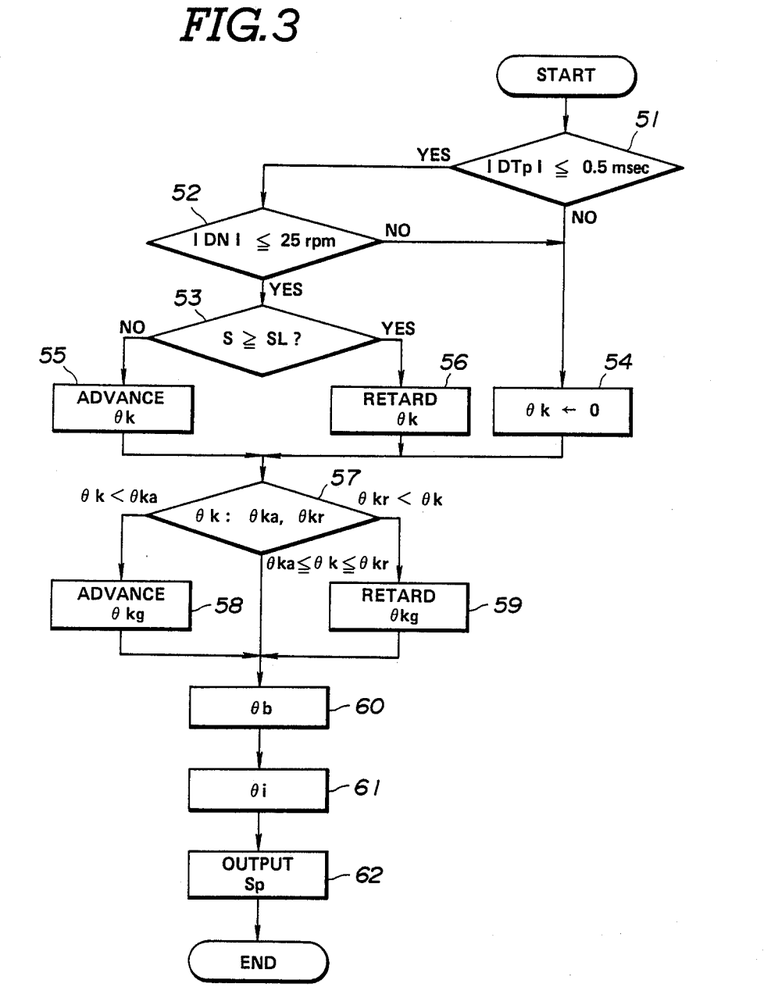
FIG. 3 is a flowchart of a program for operating the microcomputer unit of FIG. 1.

The microcomputer unit 16 operates in accordance with a program stored in the ROM within the memory unit 23. FIG. 3 is a flowchart of this program. The program is executed periodically in synchronism with a preset advance of crank angle. In more detail, the program is executed once within a crank angle interval between the moment of the A/D conversion of the knock-related signal S6 and the moment of setting of a coming target spark timing within the I/O circuit 24, and specifically within a crank angle interval between 45° ATDC and 70° BTDC on the compression stroke of each engine cylinder.

As shown in FIG. 3, a first step 51 of the program calculates the difference DTp between the current fuel injection pulse-width Tp(new) and the preceding fuel injection pulse-width Tp(old) by referring to the following equation:

$$DTp = Tp(new) - Tp(old)$$

The current pulse-width Tp(new) is obtained by reading the value of the pulse-width-representing variable Tp in the current execution cycle of the program. The read value is stored in the RAM within the memory section 23. The preceding pulse-width Tp(old) is obtained by referring to the pulse-width value which was read in the preceding execution cycle of the program and which has been stored in the RAM. It should be noted that the fuel injection pulse-width value Tp is periodically derived and updated in another program operating the microcomputer unit 16 for the control of the fuel injection rate. In addition, the fuel injection pulse-width Tp is basically adjusted in accordance with the intake air flow rate and the engine speed as described previously, so that this value Tp is a parameter representing an engine operating condition or conditions.

Then, the first step 51 determines whether or not the difference DTp resides in a preset range of −0.5 milliseconds to +0.5 milliseconds. In other words, the step 51 checks whether or not −0.5 msec≦DTp≦+0.5 msec. If the difference DTp resides in the preset range, the program advances to a step 52. If the difference DTp resides outside the preset range, the program advances to a step 54.

The step 52 calculates the difference DN between the current engine speed N(new) and the preceding engine speed N(old) by referring to the following equation:

$$DN = N(new) - N(old)$$

The current engine speed N(new) is obtained by reading the value of the engine-speed-representing variable N in the current execution cycle of the program. The read value is stored in the RAM within the memory section 23. The preceding engine speed N(old) is obtained by referring to the engine speed which was read in the preceding execution cycle of the program and which has been stored in the RAM.

Then, the step 52 determines whether or not the difference DN resides in a preset range of −25 rpm to +25 rpm. In other words, the step 52 checks whether or not −25 rpm≦DN≦+25 rpm. If the difference DTp resides in the preset range, the program advances to a step 53. If the difference DTp resides outside the preset range, the program advances to the step 54.

The preset ranges used in the determinations by the steps 51 and 52 are chosen to correspond to references for detecting whether or not operating conditions of the engine are transitional. When at least one of the engine operating conditions is transitional, the program advances to the step 54. When none of the engine operating conditions is transitional, the program advances to the step 53. It should be noted that the step 52 may detects whether or not the engine speed is transitional in accordance with a variation in the engine speed during a fixed time interval.

The step 53 derives the current integration value S from the knock-related signal S6. Specifically, the knock-related signal S6 is sampled at the end of the period of integration by the integrator 19. This sampled signal is converted into a corresponding digital signal by the A/D converter 25. This digital signal represents the integration value S. The integration value S increases with the intensity of engine knock.

Then, the step 53 derives a reference value SL from the engine operating conditions, that is, the engine speed N and the fuel injection pulse-width Tp. The ROM within the memory unit 23 holds a table in which a set of reference values are plotted as a function of the engine speed and the fuel injection pulse-width. The reference value SL is derived by referring to this table. It should be noted that the reference values SL may be varied as a direct function of at least one of the engine speed N and the intake air flow rate Q.

Finally, the step 53 compares the integration value S to the reference value SL. The reference value SL is chosen to correspond to the boundary between a knock range and an unknock range of the integration value S. If the integration value S is smaller than the reference value SL, that is, if engine knock does not occur, the program advances to a step 55. If the integration value S is equal to or greater than the reference value SL, that is, if engine knock occurs, the program advances to a step 56.

The step 55 determines or corrects the spark timing knock corrective value $\theta k$ by referring to the following equation:

$$\theta k(new) = \theta k(old) - \theta a$$

where $\theta k(new)$ is the currently determined value, $\theta k(old)$ is the preceding spark timing knock corrective value, and $\theta a$ is a preset constant corresponding to a crank angle of 0.1. In this way, the spark timing knock corrective value $\theta k$ is updated or corrected. As will be made clear hereinafter, the updating of the spark timing knock corrective value $\theta k$ by this step 55 induces an advance of the actual spark timing. After the step 55, the program advances to a step 57.

The step 56 determines or corrects the spark timing knock corrective value $\theta k$ by referring to the following equation:

$$\theta k(new) = \theta k(old) + \theta r$$

where $\theta k(new)$ is the currently determined value, $\theta k(old)$ is the preceding spark timing knock corrective value, and $\theta r$ is a preset constant corresponding to a crank angle of 1°. In this way, the spark timing knock corrective value $\theta k$ is updated or corrected. As will be made clear hereinafter, the updating of the spark timing knock corrective value $\theta k$ by this step 56 induces a retardation of the actual spark timing. After the step 56, the program advances to the step 57.

As a result of cooperation of the steps 53, 55, and 56, the actual spark timing is advanced and retarded when engine knock is absent and present respectively.

The step 54 sets the spark timing knock corrective value $\theta k$ to a preset constant equal to zero. Accordingly, when at least one engine operating condition is transitional, the spark timing knock corrective value $\theta k$ is held or fixed at zero independent of the integration value S derived from the knock related signal S6. After the step 54, the program advances to the step 57.

The step 57 compares the spark timing knock corrective value $\theta k$ to a negative reference value $\theta ka$ and a positive reference value $\theta kr$. For example, the reference value $\theta ka$ corresponds to a crank angle of $-4°$. The reference value $\theta kr$ corresponds to a crank angle of $+4°$. If the corrective value $\theta k$ is smaller than the reference value $\theta ka$, that is, if the corrective value $\theta k$ is in advance of a first reference, the program proceeds to a step 58. If the corrective value $\theta k$ is greater than the reference value $\theta kr$, that is, if the corrective value $\theta k$ is in retard of a second reference, the program proceeds to a step 59. If the corrective value $\theta k$ resides between the reference values $\theta ka$ and $\theta kr$, the program advances to a step 60.

The RAM within the memory section 23 holds a map or table in which a set of updatable spark timing learning corrective values constituting learning control factors are plotted as a function of the engine speed and the fuel injection pulse-width. When the spark timing knock corrective value $\theta k$ resides outside the range between the reference values $\theta ka$ and $\theta kr$, the steps 58 and 59 update the spark timing learning corrective values held in the learning table as will be described hereinafter. When the spark timing knock corrective value $\theta k$ resides within the range between the reference values $\theta ka$ and $\theta kg$, the spark timing learning corrective values are not updated.

The step 58 reads the spark timing learning corrective value $\theta kg(N, Tp)old$ from the learning map in accordance with the engine speed N and the fuel injection pulse-width Tp. A new spark timing learning corrective value $\theta kg(N, Tp)new$ is derived from the read learning corrective value $\theta kg(N, Tp)old$ by referring to the following equation:

$$\theta kg(N, Tp)new = \theta kg(N, Tp)old - \theta ag$$

where $\theta ag$ represents a constant corresponding to a crank angle of 0.01°. The learning corrective value $\theta kg(N, Tp)old$ in the learning map is replaced by the currently derived learning corrective value $\theta kg(N, Tp)new$. In this way, the learning corrective value $\theta kg$ is updated. As will be made clear hereinafter, the updating of the spark timing learning corrective value $\theta kg$ by this step 58 induces an advance of the actual spark timing. After the step 58, the program advances to the step 60.

The step 59 reads the spark timing learning corrective value $\theta kg(N, Tp)old$ from the learning map in accordance with the engine speed N and the fuel injection pulse-width Tp. A new spark timing learning corrective value $\theta kg(N, Tp)new$ is derived from the read learning corrective value $\theta kg(N, Tp)old$ by referring to the following equation:

$$\theta kg(N, Tp)new = \theta kg(N, Tp)old + \theta rg$$

where $\theta ag$ represents a constant corresponding to a crank angle of 0.1°. The learning corrective value $\theta kg(N, Tp)old$ in the learning map is replaced by the currently derived learning corrective value $\theta kg(N, Tp)new$. In this way, the learning corrective value $\theta kg$ is updated. As will be made clear hereinafter, the updating of the spark timing learning corrective value $\theta kg$ by this step 59 induces a retardation of the actual spark timing. After the step 59, the program advances to the step 60.

It should be noted that the spark timing learning corrective velures may depend on only one of the engine speed and the fuel injection pulse-width.

The step 60 determines a basic target spark advance angle or a basic target spark timing $\theta b$ in accordance with the engine speed N and the fuel injection pulse-width Tp. Specifically, the ROM within the memory section 23 holds a table in which a set of basic target spark advance angles or basic target spark timings are plotted as a function of the engine speed and the fuel injection pulse-width. The basic target spark timing $\theta b$ is derived by referring to this table.

A step 61 following the step 60 reads the spark timing learning corrective value $\theta kg(N, Tp)$ from the learing map in accordance with the engine speed N and the fuel injection pulse-width Tp. Then, a final target spark advance angle or a final target spark timing $\theta i$ is calculated from the basic target spark timing $\theta b$, the learning corrective value $\theta kg(N, Tp)$, and the knock corrective value $\theta k$ by referring to the following equation:

$$\theta i = \theta b - \theta kg(N, Tp) + \theta k ]$$

After the step 61, the program advances to a step 62.

The step 62 adjusts the spark control signal Sp in accordance with the final target spark timing $\theta i$ so that a spark occurs in the engine cylinder at a timing corresponding to the final target spark timing $\theta i$. Specifically, the leading or trailing edge of a spark control pulse Sp which determines the actual spark timing is adjusted to be concurrent with the final target spark timing. After the step 62, the present execution cycle of the program ends.

Figure 4:
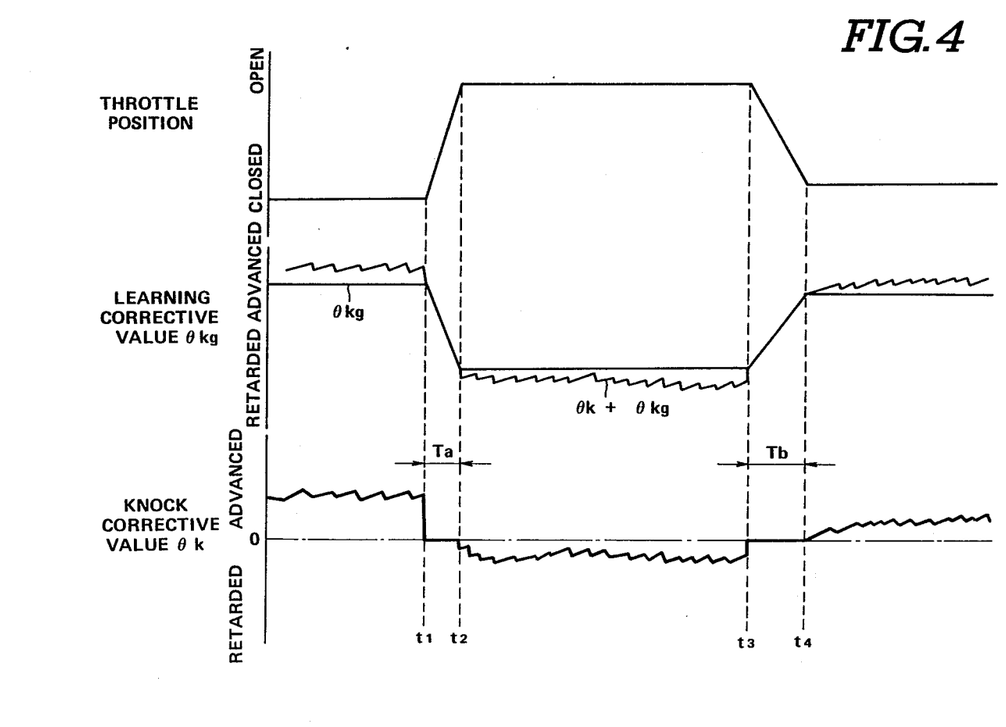
FIG. 4 is a timing diagram of an engine throttle valve position, and the spark timing learning corrective value and the spark timing knock corrective value determined by the control system of FIG. 1.

Overall operation will follow with reference to FIG. 4. It is assumed that the throttle valve (not shown) of an engine remains in a first slightly open position or in essentially a closed position until a first moment t1 as shown in FIG. 4. At the first moment t1, the engine throttle valve moves out of the first slightly open position. During an interval Ta between the first moment t1 and a second moment t2, the engine throttle valve rapidly moves toward a widely open position. At the second moment t2, the engine throttle valve assumes the widely open position. During an interval between the second moment t2 and a third moment t3, the engine throttle valve remains in the widely open position. At the third moment t3, the engine throttle valve moves out of the widely open position. During an interval Tb between the third moment t3 and a fourth moment t4, the engine throttle valve rapidly moves toward a second slightly open position. At the fourth moment t4, the engine throttle valve assumes the second slightly open position. After the fourth moment t4, the engine throttle valve remains in the second slightly open position.

Before the first moment t1, the engine throttle valve remains in the first slightly open position so that the engine speed and the fuel injection pulse-width are generally constant. Such constant engine operating conditions are detected by the steps 51 and 52 (see FIG. 3). When these constant engine operating conditions are detected, the spark timing knock corrective value $\theta k$ is adjusted in accordance with the knock related signal S6 by the steps 53, 55, and 56 (see FIG. 3). Therefore, in this case, the final target spark timing value $\theta i$ is adjusted in accordance with all of the basic target spark timing value $\theta b$, the spark timing learning corrective value $\theta kg$, and the spark timing knock corrective value $\theta k$ dependent on the knock related signal S6.

During the engine acceleration period Ta between the first and second moments t1 and t2, the engine throttle valve is opened rapidly so that the engine speed and/or the fuel injection pulse-width increase at high rates. Such a transitional engine operating condition or conditions are detected by the steps 51 and 52 (see FIG. 3). When the transitional engine operating condition or conditions are detected, the spark timing knock corrective value $\theta k$ is set to and fixed at zero by the step 54 (see FIG. 3) as shown in FIG. 4. In this case, the final target spark timing $\theta i$ is made independent of the current knock related signal S6 but the final timing $\theta i$ is dependent on the basic target spark timing value $\theta b$ and on the spark timing learning corrective value $\theta kg$ in agreement with the following equation:

$$\theta i = \theta b - \theta kg$$

Accordingly, under conditions where the spark timing knock corrective value $\theta k$ is relatively advanced during a period immediately prior to the first moment t1, the final target spark timing $\theta i$ is prevented from excessively advancing during a period following the first moment t1. It should be noted that if the spark timing control dependent on the current knock related signal S6 via the spark timing knock corrective value $\theta k$ is maintained during the engine acceleration period Ta as in the conventional spark timing control system, the final target spark timing tends to advance excessively during a period following the first moment t1.

During the period between the second and third moments t2 and t3, the engine moves into and remains under constant operating conditions so that the final target spark timing $\theta i$ is adjusted in accordance with all of the basic target spark timing $\theta b$, the spark timing learning corrective value $\theta kg$, and the spark timing knock corrective value $\theta k$ dependent on the current knock related signal S6.

During the engine deceleration period Tb between the third and fourth moments t3 and t4, the engine throttle valve is closed rapidly so that the engine speed and/or the fuel injection pulse-width decrease at high rates. Such a transitional engine operating condition or conditions are detected by the steps 51 and 52 (see FIG. 3). When the transitional engine operating condition or conditions are detected, the spark timing knock corrective value $\theta k$ is set to and fixed at zero by the step 54 (see FIG. 3) as shown in FIG. 4. In this case, the final target spark timing $\theta i$ is made independent of the current knock related signal S6 but the final timing $\theta i$ is dependent on the basic target spark timing $\theta b$ and on the spark timing learning corrective value $\theta kg$ in agreement with the following equation:

$$\theta i = \theta b - \theta kg$$

Accordingly, under conditions where the spark timing knock corrective value $\theta k$ is relatively retarded during a period immediately prior to the third moment t3, the final target spark timing $\theta i$ is prevented from excessively retarding during a period following the third moment t3. It should be noted that if the spark timing control dependent on the current knock related signal S6 via the spark timing knock corrective value $\theta k$ is maintained during the deceleration period Tb as in the conventional spark timing control system, the final target spark timing tends to retard excessively during a period following the third moment t3.

After the fourth moment t4, the engine moves into and remains under constant operating conditions so that the final target spark timing $\theta i$ is adjusted in accordance with all of the basic target spark timing $\theta b$, the spark timing learning corrective value $\theta kg$, and the spark timing knock corrective value $\theta k$ dependent on the current knock related signal S6.

DESCRIPTION OF THE SECOND PREFERRED EMBODIMENT

Figure 5:
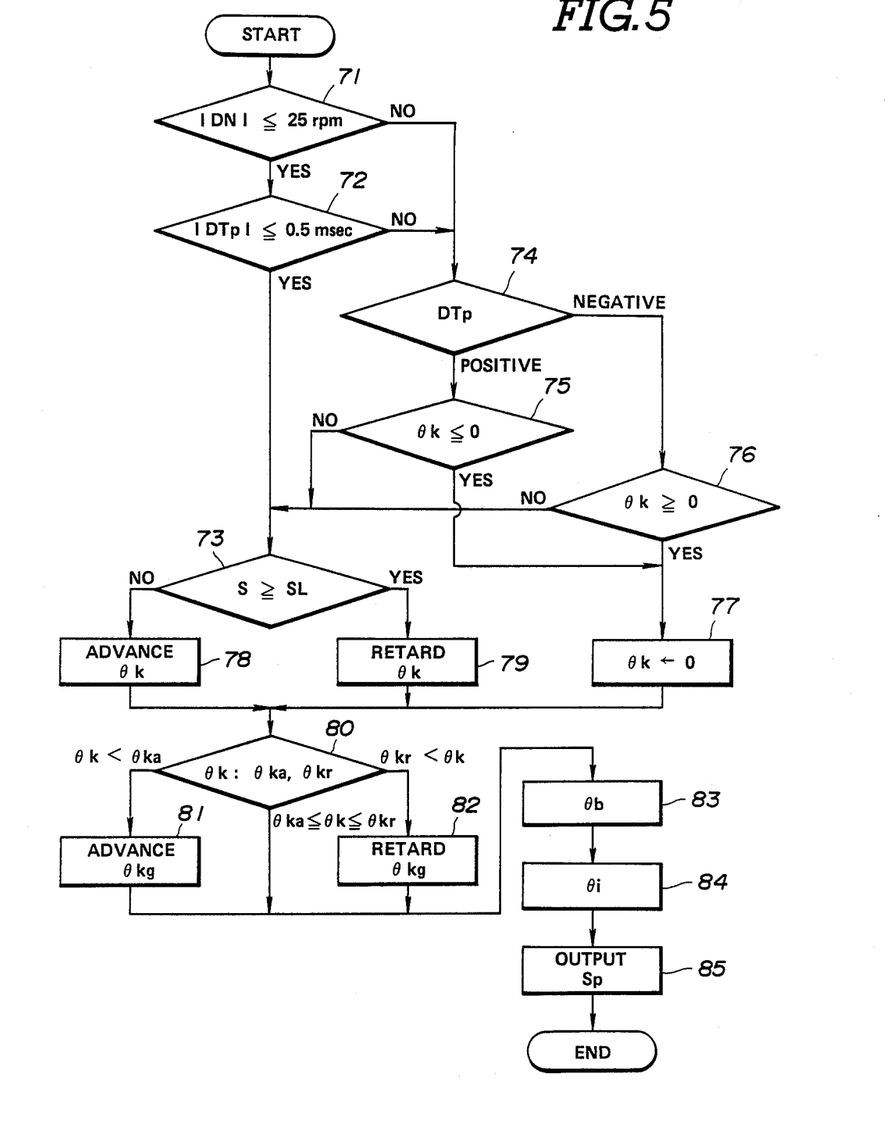
FIG. 5 is a flowchart of a microcomputer operating program according to a second embodiment of this invention.

A second embodiment of this invention is similar to the embodiment of FIGS. 1-4 except for design changes indicated hereinafter. The second embodiment includes a modified program for operating the microcomputer unit 16 (see FIG. 1). It should be noted that this program is held by the ROM within the memory section 23 (see FIG. 1). In addition, this program is periodically executed in synchronism with a preset angular advance of the engine crankshaft as the program of FIG. 3 is executed. FIG. 5 is a flowchart of the modified program.

As shown in FIG. 5, a first step 71 of the program detects whether or not the engine speed is transitional as in the step 52 of FIG. 3. Specifically, the step 51 calculates the difference DN between the current engine speed value N(new) and the preceding engine speed value N(old) by referring to the following equation:

$$DN = N(new) - N(old)$$

Then, the step 71 determines whether or not the difference DN resides in a preset range of −25 rpm to +25 rpm. If the difference DN resides in the preset range, the program advances to a step 72. If the difference DN resides outside the preset range, the program advances to a step 74.

The step 72 detects whether or not the fuel injection pulse-width is transitional as in the step 51 of FIG. 3. Specifically, the step 72 of the program calculates the difference DTp between the current fuel injection pulse-width Tp(new) and the preceding fuel injection pulse-width Tp(old) by referring to the following equation:

$$DTp = Tp(new) - Tp(old)$$

Then, the step 72 determines whether or not the difference DTp resides in a preset range of −0.5 milliseconds to +0.5 milliseconds. If the difference DTp resides in the preset range, the program advances to a step 73. If the difference DTp resides outside the preset range, the program advances to the step 74.

As a result of the steps 71 and 72, when at least one of the engine speed and the fuel injection pulse-width is transitional, the program advances to the step 74. When none of these engine operating conditions is transitional, the program advances to the step 73.

The step 74 detects whether the engine is accelerating or decelerating in accordance with the pulse-width difference DTp. Specifically, the step 74 checks whether the pulse-width difference DTp is positive or negative. If the pulse-width difference DTp is positive, that is, if the engine is accelerating, the program advances to a step 75. If the pulse-width difference DTp is negative, that is, if the engine is decelerating, the program advances to a step 76. It should be noted that the rate of fuel injection is essentially proportional to the fuel injection pulse-width.

The step 75 checks whether or not the spark timing knock corrective value $\theta k$ which was determined in the preceding execution cycle of the program is greater than zero. If the knock corrective value $\theta k$ is equal to or less than zero, that is, if the final target spark timing $\theta i$ is generally in advance of the basic target spark timing $\theta b$, the program proceeds to a step 77. If the knock corrective value $\theta k$ is greater than zero, that is, if the final target spark timing $\theta i$ is in retard of the basic target spark timing $\theta b$, the program proceeds to the step 73.

The step 76 checks whether or not the spark timing knock corrective value $\theta k$ which was determined in the preceding execution cycle of the program is smaller than zero. If the knock corrective value $\theta k$ is equal to or greater than zero, that is, if the final target spark timing $\theta i$ is generally in retard of the basic target spark timing $\theta b$, the program proceeds to the step 77. If the knock corrective value $\theta k$ is smaller than zero, that is, if the final target spark timing $\theta i$ is in advance of the basic target spark timing $\theta b$, the program proceeds to the step 73.

The step 77 sets the spark timing knock corrective value $\theta k$ to a preset constant equal to zero. Accordingly, in cases where the engine is accelerated and where the final target spark timing is relatively advanced at a moment immediately prior to the initiation of the engine acceleration, the spark timing knock corrective value $\theta k$ is held or fixed at zero during the engine acceleration. Also, in cases where the engine is decelerated and where the final target spark timing is relatively retarded at a moment immediately prior to the initiation of the engine deceleration, the spark timing knock corrective value $\theta k$ is held or fixed at zero during the engine deceleration. After the step 77, the program advances to a step 80.

The step 73 detects whether or not engine knock occurs in accordance with the knock related signal S6 (see FIG. 1) as in the step 53 of FIG. 3. Specifically, the current integration value S is derived from the knock-related signal S6. Then, a reference value SL is derived from the engine operating conditions, that is, the engine speed N and the fuel injection pulse-width Tp. Finally, the integration value S is compared to the reference value SL. If the integration value S is smaller than the reference value SL, that is, if engine knock does not occur, the program advances to a step 78. If the integration value S is equal to or greater than the reference value SL, that is, if engine knock occurs, the program advances to a step 79.

The step 78 determines or corrects the spark timing knock corrective value $\theta k$ by referring to the following equation:

$$\theta k(new) = \theta k(old) - \theta a$$

where $\theta k(new)$ is the currently determined value, $\theta k(old)$ is the preceding spark timing knock corrective value, and $\theta a$ is a preset constant corresponding to a crank angle of 0.1°. In this way, the spark timing knock corrective value $\theta k$ is updated or corrected. As will be made clear hereinafter, the updating of the spark timing knock corrective value $\theta k$ by this step 78 induces an advance of the actual spark timing. After the step 78, the program advances to the step 80.

The step 79 determines or corrects the spark timing knock corrective value $\theta k$ by referring to the following equation:

$$\theta k(new) = \theta k(old) + \theta r$$

where $\theta k(new)$ is the currently determined value, $\theta k(old)$ is the preceding spark timing knock corrective value, and $\theta r$ is a preset constant corresponding to a crank angle of 1°. In this way, the spark timing knock corrective value $\theta k$ is updated or corrected. As will be made clear hereinafter, the updating of the spark timing knock corrective value $\theta k$ by this step 79 induces a retardation of the actual spark timing. After the step 79, the program advances to the step 80.

The step 80 compares the spark timing knock corrective value $\theta k$ to a negative reference value $\theta ka$ and a positive reference value $\theta kr$. For example, the reference value $\theta ka$ corresponds to a crank angle of −4° The reference value $\theta kr$ corresponds to a crank angle of +4°. If the corrective value $\theta k$ is smaller than the reference value $\theta ka$, that is, if the corrective value $\theta k$ is in advance of a first reference, the program proceeds to a step 81. If the corrective value $\theta k$ is greater than the reference value $\theta kr$, that is, if the corrective value $\theta k$ is in retard of a second reference, the program proceeds to a step 82. If the corrective value $\theta k$ resides between the reference values $\theta ka$ and $\theta kr$, the program advances to a step 83.

The step 81 corrects or updates the spark timing learning corrective value $\theta kg$ as in the step 58 of FIG. 3. Specifically, the spark timing learning corrective value $\theta kg(N, Tp)old$ is read or derived from the learning map in accordance with the engine speed N and the fuel injection pulse-width Tp. A new spark timing learning corrective value $\theta kg(N, Tp)new$ is derived from the read learning corrective value $\theta kg(N, Tp)old$ by referring to the following equation:

$$\theta kg(N, Tp)new = \theta kg(N, Tp)old - \theta ag$$

where $\theta ag$ represents a constant corresponding to a crank angle of 0.01°. The learning corrective value $\theta kg(N, Tp)old$ in the learning map is replaced by the currently derived learning corrective value $\theta kg(N, Tp)new$. In this way, the learning corrective value $\theta kg$ is updated or corrected. As will be made clear hereinafter, the updating of the spark timing learning corrective value $\theta kg$ by this step 81 induces an advance of the actual spark timing. After the step 81, the program advances to the step 83.

The step 82 corrects or updates the spark timing learning corrective value $\theta kg$ as in the step 59 of FIG. 3. The spark timing learning corrective value $\theta kg(N, Tp)$old is read or derived from the learning map in accordance with the engine speed N and the fuel injection pulse-width Tp. A new spark timing learning corrective value $\theta kg(N, Tp)$new is derived from the read learning corrective value $\theta kg(N, Tp)$old by referring to the following equation:

$$\theta kg(N, Tp)new = \theta kg(N, Tp)old + \theta rg$$

where $\theta rg$ represents a constant corresponding to a crank angle of 0.1°. The learning corrective value $\theta kg(N, Tp)$old in the learning map is replaced by the currently derived learning corrective value $\theta kg(N, Tp)$new. In this way, the learning corrective value $\theta kg$ is updated or corrected. As will be made clear hereinafter, the updating of the spark timing learning corrective value $\theta kg$ by this step 82 induces a retardation of the actual spark timing. After the step 82, the program advances to the step 83.

The step 83 determines a basic target spark advance angle or a basic target spark timing $\theta b$ in accordance with the engine speed N and the fuel injection pulse-width Tp as in the step 60 of FIG. 3.

A step 84 following the step 83 reads the spark timing learning corrective value $\theta kg(N, Tp)$ from the learing map in accordance with the engine speed N and the fuel injection pulse-width Tp. Then, a final target spark advance angle or a final target spark timing $\theta i$ is calculated from the basic target spark timing $\theta b$, the learning corrective value $\theta kg(N, Tp)$, and the knock corrective value $\theta k$ by referring to the following equation:

$$\theta i = \theta b - [\theta kg(N, Tp) + \theta k]$$

After the step 84, the program advances to a step 85.

The step 85 adjusts the spark control signal Sp in accordance with the final target spark timing $\theta i$ so that a spark occurs in the engine cylinder at a timing corresponding to the final target spark timing $\theta i$. After the step 85, the present execution cycle of the program ends.

Figure 6:
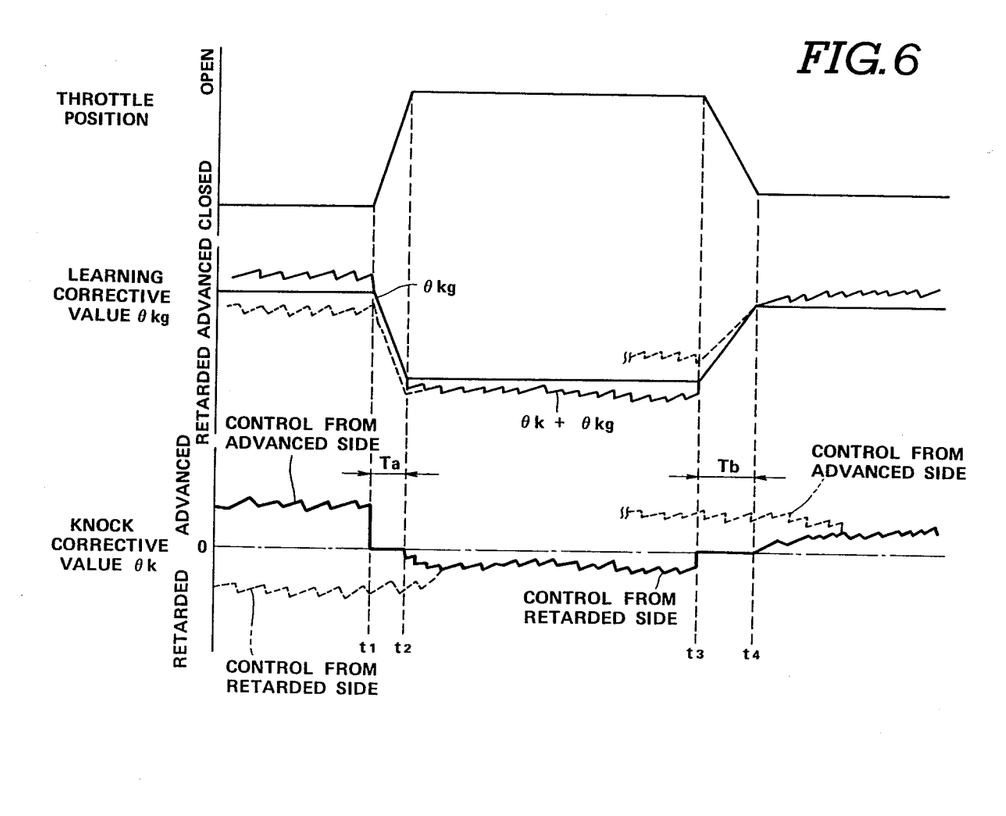
FIG. 6 is a timing diagram of an engine throttle valve position, and the spark timing learning corrective value and the spark timing knock corrective value determined in the second embodiment of this invention.

Overall operation will follow with reference to FIG. 6. It is assumed that the engine throttle valve remains in a first slightly open position or in essentially a closed position until a first moment t1 as shown in FIG. 6. At the first moment t1, the engine throttle valve moves out of the first slightly open position. During an interval Ta between the first moment t1 and a second moment t2, the engine throttle valve rapidly moves toward a widely open position. At the second moment t2, the engine throttle valve assumes the widely open position. During an interval between the second moment t2 and a third moment t3, the engine throttle valve remains in the widely open position. At the third moment t3, the engine throttle valve moves out of the widely open position. During an interval Tb between the third moment t3 and a fourth moment t4, the engine throttle valve rapidly moves toward a second slightly open position. At the fourth moment t4, the engine throttle valve assumes the second slightly open position. After the fourth moment t4, the engine throttle valve remains in the second slightly open position.

Before the first moment t1, the engine throttle valve remains in the first slightly open position so that the engine speed and the fuel injection pulse-width are generally constant. Such constant engine operating conditions are detected by the steps 71 and 72 (see FIG. 5). When these constant engine operating conditions are detected, the spark timing knock corrective value $\theta k$ is adjusted in accordance with the knock related signal S6 by the steps 73, 78, and 79 (see FIG. 5). Therefore, in this case, the final target spark timing $\theta i$ is adjusted in accordance with all of the basic target spark timing $\theta b$, the spark timing learning corrective value $\theta kg$, and the spark timing knock corrective value $\theta k$ dependent on the current knock related signal S6.

During the engine acceleration period Ta between the first and second moments t1 and t2, the engine throttle valve is opened rapidly so that the engine speed and/or the fuel injection pulse-width increase at high rates. Such engine acceleration is detected by the steps 71, 72, and 74 (see FIG. 5). Upon detection of the engine acceleration, the step 75 (see FIG. 5) detects whether or not the spark timing knock corrective value $\theta k$ which was determined at a moment immediately prior to the first moment t1 is relatively advanced. When the knock corrective value $\theta k$ is relatively advanced as shown by the solid line in FIG. 6, the spark timing knock corrective value $\theta k$ is set to and fixed at zero by the step 77 (see FIG. 5) as shown in FIG. 6. In this case, the final target spark timing $\theta i$ is made independent of the current knock related signal S6, but the final timing $\theta i$ is dependent on the basic target spark timing $\theta b$ and on the spark timing learning corrective value $\theta kg$ in agreement with the following equation:

$$\theta i = \theta b - \theta kg$$

Accordingly, under conditions where the spark timing knock corrective value $\theta k$ is relatively advanced during a period immediately prior to the first moment t1, the final target spark timing $\theta i$ is prevented from excessively advancing during a period following the first moment t1. It should be noted that if the spark timing control dependent on the current knock related signal S6 via the spark timing knock corrective value $\theta k$ is maintained during the acceleration period Ta as in the conventional spark timing control system, the final target spark timing tends to advance excessively during a period following the first moment t1.

During the acceleration period Ta, when the spark timing knock corrective value $\theta k$ which was determined at a moment immediately prior to the first moment t1 is relatively retarded as shown by the broken line in FIG. 6, the knock corrective value $\theta k$ is kept dependent on the current knock related signal S6 so that the final target spark timing is adjusted in accordance with all of the basic target spark timing $\theta b$, the spark timing learning corrective value $\theta kg$, and the spark timing knock corrective value $\theta k$ dependent on the current knock related signal S6.

During the period between the second and third moments t2 and t3, the engine moves into and remains under constant operating conditions so that the final target spark timing $\theta i$ is adjusted in accordance with all of the basic target spark timing $\theta b$, the spark timing learning corrective value $\theta kg$, and the spark timing knock corrective value θk dependent on the current knock related signal S6.

During the deceleration period Tb between the third and fourth moments t3 and t4, the engine throttle valve is closed rapidly so that the engine speed and/or the fuel injection pulse-width decrease at high rates. Such engine deceleration is detected by the steps 71, 72, and 74 (see FIG. 5). Upon detection of the engine deceleration, the step 76 (see FIG. 5) detects whether or not the spark timing knock corrective value θk which was determined at a moment immediately prior to the first moment t1 is relatively retarded. When the knock corrective value θk is relatively retarded as shown by the solid line in FIG. 6, the spark timing knock corrective value θk is set to and fixed at zero by the step 77 (see FIG. 5) as shown by the solid line in FIG. 6. In this case, the final target spark timing θi is made independent of the current knock related signal S6, but the final timing θi is dependent on the basic target spark timing θb and on the spark timing learning corrective value θkg in agreement with the following equation:

$$\theta i = \theta b - \theta kg$$

Accordingly, under conditions where the spark timing knock corrective value θk is relatively retarded during a period immediately prior to the third moment t3, the final target spark timing θi is prevented from excessively retarding during a period following the third moment t3. It should be noted that if the spark timing control dependent on the current knock related signal S6 via the spark timing knock corrective value θk is maintained during the deceleration period Tb as in the conventional spark timing control system, the final target spark timing tends to retard excessively during a period following the third moment t3.

During the deceleration period Tb, when the spark timing knock corrective value θk which was determined at a moment immediately prior to the third moment t3 is relatively advanced as shown by the broken line in FIG. 6, the knock corrective value θk is kept dependent on the current knock related signal S6 so that the final target spark timing is adjusted in accordance with all of the basic target spark timing θb, the spark timing learning corrective value θkg, and the spark timing knock corrective value θk dependent on the current knock related signal S6.

After the fourth moment t4, the engine moves into and remains under constant operating conditions so that the final target spark timing θi is adjusted in accordance with all of the basic target spark timing value θb, the spark timing learning corrective value θkg, and the spark timing knock corrective value θk dependent on the current knock related signal S6.

What is claimed is:

1. A spark timing control system for an engine comprising:
   (a) means for detecting an operating condition of the engine;
   (b) means for detecting whether a knock is present or absent in the engine;
   (c) means for determining a basic target spark timing in accordance with the engine operating condition;
   (d) means for determining a spark timing knock corrective value in accordance with the detection of the presence or absence of the knock;
   (e) means for determining a spark timing learning corrective value in accordance with the spark timing knock corrective value and with the engine operating condition;
   (f) means for detecting a transitional condition of the engine;
   (g) means for, when the transitional engine condition is detected, fixing the spark timing knock corrective value at a preset value independent of the detection of the presence or absence of the knock and also independent of the engine operating condition;
   (h) means for determining a final target spark timing in accordance with the basic target spark timing, the spark timing knock corrective value, and the spark timing learning corrective value; and
   (i) means for generating a spark in the engine at a timing in agreement with the final target spark timing.

2. The system of claim 1, further comprising:
   (a) means for detecting acceleration of the engine in accordance with the transitinal engine condition;
   (b) means for detecting whether or not the spark timing knock corrective value is in a preset advanced range;
   (c) means for, when the engine acceleration is detected and the spark timing knock corrective value is in the preset advanced range, enabling the fixation of the spark timing knock corrective value; and
   (d) means for, when the engine acceleration is detected and the spark timing knock corrective value is outside the preset advanced range, disabling the fixation of the spark timing knock corrective value.

3. The system of claim 1, further comprising:
   (a) means for detecting deceleration of the engine in accordance with the transitional engine condition;
   (b) means for detecting whether or not the spark timing knock corrective value is in a preset retarded range;
   (c) means for, when the engine deceleration is detected and the spark timing knock corrective value is in the preset retarded range, enabling the fixation of the spark timing knock corrective value; and
   (d) means for, when the engine deceleration is detected and the spark timing knock corrective value is outside the preset retarded range, disabling the fixation of the spark timing knock corrective value.

4. A spark timing control system for an engine comprising:
   (a) means for detecting an operating condition of the engine;
   (b) means for detecting whether or not a knock is present or absent in the engine;
   (c) means for determining a basic target spark timing in accordance with the engine operating condition;
   (d) means for determining a spark timing knock corrective value in accordance with the detection of the presence or absence of the knock;
   (e) means for determining a spark timing learning corrective value in accordance with the spark timing knock corrective value and with the engine operating condition;
   (f) means for detecting acceleration of the engine;
   (g) means for detecting deceleration of the engine;
   (h) means for detecting whether or not the spark timing knock corrective value is in a preset advanced range;

(i) means for detecting whether or not the spark timing knock corrective value is in a preset retarded range;

(j) means for, when the engine acceleration is detected and the Spark timing knock corrective value is in the preset advanced range, fixing the spark timing knock corrective value at a preset value independent of the detection of the presence or absence of the knock and also independent of the engine operating condition;

(k) means for, when the engine deceleration is detected and the spark timing knock corrective value is in the preset retarded range, fixing the spark timing knock corrective value at the preset value independent of the detection of the presence or absence of the knock and also independent of the engine operating condition;

(l) means for determining a final target spark timing in accordance with the basic target spark timing, the spark timing knock corrective value, and the spark timing learning corrective value; and (m) means for generating a spark in the engine at a timing in agreement with the final target spark timing.

5. A method for controlling spark timing of an engine, comprising the steps of:

(a) detecting an operating condition of the engine;

(b) detecting whether a knock is present or absent in the engine;

(c) determining a basic target spark timing in accordance with the engine operating condition;

(d) determining a spark timing knock corrective value in accordance with the detection of the presence or absence of the knock;

(e) determining a spark timing learning corrective value in accordance with the spark timing knock corrective value and with the engine operating condition;

(f) detecting a transitional condition of the engine;

(g) fixing the spark timing knock corrective value at a preset value independent of the detection of the presence or absence of the knock and also independent of the engine operating condition when the transitional engine condition is detected.

(h) determining a final target spark timing in accordance with the basic target spark timing, the spark timing knock corrective value, and the spark timing learning corrective value; and (i) generating a spark in the engine at a timing in agreement with the final target spark timing.

6. The method of claim 5, further comprising the steps of:

(a) detecting acceleration of the engine in accordance with the transitional engine condition;

(b) detecting whether or not the spark timing knock corrective value is in a preset advanced range;

(c) enabling the fixation of the spark timing knock corrective value when the engine acceleration is detected and the spark timing knock corrective value is in the preset advanced range; and (d) disabling the fixation of the spark timing knock corrective value when the engine acceleration is detected and the spark timing knock corrective value is outside the preset advanced range.

7. The method of claim 5, further comprising the steps of:

(a) detecting deceleration of the engine in accordance with the transitional engine condition;

(b) detecting whether or not the spark timing knock corrective value is in a preset retarded range;

(c) enabling the fixation of the spark timing knock corrective value when the engine deceleration is detected and the spark timing knock corrective value is in the preset retarded range; and (d) disabling the fixation of the spark timing knock corrective value when the engine deceleration is detected and the spark timing knock corrective value is outside the preset retarded range.

8. A method for controlling spark timing of an engine, (a) detecting an operating condition of the engine;

(b) detecting whether or not a knock is present or absent in the engine;

(c) determining a basic target spark timing in accordance with the engine operating condition;

(d) determining a spark timing knock corrective value in accordance with the detection of the presence or absence of the knock;

(e) determining a spark timing learning corrective value in accordance with the spark timing knock corrective value and with the engine operating condition;

(f) detecting acceleration of the engine;

(g) detecting deceleration of the engine;

(h) detecting whether or not the spark timing knock corrective value is in a preset advance range;

(i) detecting whether or not the spark timing knock corrective value is in a preset retarded range;

(j) fixing the spark timing knock corrective value at a preset value independent of the detection of the presence or absence of the knock and also independent of the engine operating condition when the engine acceleration is detected and the spark timing knock corrective value is in the preset advanced range;

(k) fixing the spark timing knock corrective value at the preset value independent of the detection of the presence or absence of the knock and also independent of the engine operating condition when the engine deceleration is detected and the spark timing knock corrective value is in the preset retarded range;

(l) determining a final target spark timing in accordance with the basic target spark timing, the spark timing knock corrective value, and the spark timing learning corrective value; and (m) generating a spark in the engine at a timing in agreement with the final target spark timing.

* * * * *